United States Patent
Ah Sue

(10) Patent No.: US 7,016,947 B1
(45) Date of Patent: Mar. 21, 2006

(54) CONVENIENT CONFIGURATION OF AN IDENTIFIER OF A SEGMENT OF A VIRTUAL CIRCUIT

(75) Inventor: John Dany Ah Sue, San Jose, CA (US)

(73) Assignee: Cisco Technology, Inc, San Jose, CA (US)

(*) Notice: Subject to any disclaimer, the term of this patent is extended or adjusted under 35 U.S.C. 154(b) by 754 days.

(21) Appl. No.: 10/014,610

(22) Filed: Dec. 14, 2001

(51) Int. Cl.
  *G06F 15/177* (2006.01)

(52) U.S. Cl. ............... 709/221; 709/228; 709/239; 370/224; 370/236.2

(58) Field of Classification Search ........ 709/208–209, 709/220–221, 227–228; 370/224, 236.2, 370/328, 338, 400–402
See application file for complete search history.

(56) References Cited

U.S. PATENT DOCUMENTS

| | | | |
|---|---|---|---|
| 5,659,540 A * | 8/1997 | Chen et al. ............... | 370/249 |
| 5,818,842 A * | 10/1998 | Burwell et al. ............. | 370/397 |
| 5,878,031 A * | 3/1999 | Ahmad et al. .............. | 370/249 |
| 5,889,778 A * | 3/1999 | Huscroft et al. ........ | 370/395.31 |
| 6,181,680 B1 * | 1/2001 | Nagata et al. .............. | 370/248 |
| 6,269,083 B1 * | 7/2001 | Nagata et al. .............. | 370/248 |
| 6,424,629 B1 * | 7/2002 | Rubino et al. ............. | 370/241.1 |
| 6,563,795 B1 * | 5/2003 | Gruber et al. .............. | 370/248 |
| 6,636,484 B1 * | 10/2003 | Agrawal et al. ............ | 370/248 |
| 6,650,646 B1 * | 11/2003 | Galway et al. ............. | 370/397 |
| 6,693,911 B1 * | 2/2004 | Yamanaka ................ | 370/395.3 |
| 2003/0210698 A1 * | 11/2003 | Rouleau ..................... | 370/397 |
| 2004/0052263 A1 * | 3/2004 | Xu .............................. | 370/399 |

OTHER PUBLICATIONS

ITU-T Recommendation I.610 (Feb. 1999); Entitled: "Series I: Integrated Services Digital Network Maintenance principles; B-ISDN operation and maintenance principles and functions"; Available from www.atmforum.com ; (116 pages).

Pending U.S. Appl. No. 09/965,837, filed: Oct. 1, 2001; Inventors: Bangolae et al; Entitled:"Configuration of an Identifier of a Segment of a Virtual Circuit"; ( 19 pages of specification and 4 she ts of drawings).

* cited by examiner

*Primary Examiner*—Zarni Maung
*Assistant Examiner*—Van Nguyen
(74) *Attorney, Agent, or Firm*—Narendra R Thappeta

(57) ABSTRACT

Configuring a segment identifier in a customer premise equipment (CPE) connected to a network. Several OAM loopback cells containing possible segment identifiers in the headers may be transmitted. If an accurate segment identifier is used, the corresponding loopback cell may be received again in the CPE as an end system at the other end of the virtual circuit may loopback the cell. Thus, the CPE may be configured with the segment identifier corresponding to the received loopback cell. Once configured, new additional cells may be transmitted with the configured segment identifier.

22 Claims, 4 Drawing Sheets

CONVENIENT CONFIGURATION OF AN IDENTIFIER OF A SEGMENT OF A VIRTUAL CIRCUIT

RELATED APPLICATIONS

The present application is related to the commonly owned co-pending Non-Provisional Utility patent application Ser. No. 09/965,837, Filed: Oct. 1, 2001, entitled, "Configuration of an Identifier of a Segment of a Virtual Circuit", naming as Inventor(s): Bangolae et al.

BACKGROUND OF THE INVENTION

1. Field of the Invention

The present invention relates to telecommunication networks, and more specifically to a method and apparatus for configuring an identifier of a segment of a virtual circuit in an end system (e.g., customer premise equipment (CPE) communicating using ATM).

2. Related Art

Virtual circuits are often provisioned between end systems. End systems refer to devices such as customer premise equipment (CPEs) and routers at which virtual circuits terminate. The end systems interface with user systems (e.g., personal computer systems and servers) and enable communication (and thus applications) between the user systems as is well known in the relevant arts.

A path of each provisioned virtual circuit between two end systems is generally defined by a sequence of switches provided on a network. The portion of the path between each pair of devices (including switches and end systems) may be referred to as a segment. Thus, a virtual circuit may be viewed as containing a sequence of segments, with each segment connecting a pair of devices.

An identifier is often used to identify each segment of the virtual circuit. For example, in asynchronous transfer mode (ATM) based networks, each segment is identified by VPI/VCI (virtual path identifier and virtual channel identifier) as is well known in the relevant arts. Thus, the VPI/VCI may be referred to as a segment identifier. In operation, each device sends data with the segment identifier in a header portion, and a receiving device identifies the data with the virtual circuit based on the segment identifier.

Thus, an end system generally needs to be configured with an identifier ("segment identifier") of a segment (of a virtual circuit) connecting the end system to a next switch in the path of the virtual circuit. The end system can then send data on the corresponding virtual circuit using the configured identifier.

Convenience of configuring segment identifiers is of particular interest at devices such as CPEs which are located in locations such as homes and offices. Convenience of configuration may be of interest generally because users at such locations may not be quite familiar with the configuration aspects of the CPE and/or technology. Accordingly, what is needed is a method and apparatus which enables convenient configuration of devices such as at least CPEs which are used at homes.

SUMMARY OF THE INVENTION

A device in accordance with the present invention may conveniently determine a segment identifier (of a segment of virtual circuit), which can be used to transmit packets (e.g., ATM cells) on the corresponding virtual circuit. The device may send several loopback cells, each containing a potential segment identifier. If a correct segment identifier is used in the header of a packet, the packet may be looped back (sent back) by an end system at the other end of the virtual circuit.

Thus, the device may determine if a received packet is a looped back packet (received in response to a previously sent packet). The segment identifier in such a packet is used to configure the device. Once configured, the segment identifier may be used to send additional cells. In an embodiment, the device corresponds to a customer premise equipment and the packet corresponds to a OAM (operation and maintenance) loopback cell.

As the segment identifier can be determined and configured potentially with minimal user intervention, the present invention can be used to conveniently configure a segment identifier in a device. In addition, the segment identifier can be determined quickly as a device can initiate the determination task and potentially use all the available bandwidth on a communication path to send loopback cells.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

A device in accordance with the present invention sends loopback cells, with each cell containing a potentially correct segment identifier. If a loopback cell is received back, the device determines the segment identifier in the received loopback cell to be the correct segment identifier. The correct segment identifier may then potentially be automatically (without additional human intervention) configured in the device.

Once configured, the device may be able to transmit data using the configured segment identifier. As details such as the correct segment identifier are shielded from a user configuring the device, the present invention provides a convenient mechanism to configure devices. In an embodiment, the intervention (effort) required of a user in configuring is substantially minimized by performing several configuration related tasks automatically.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
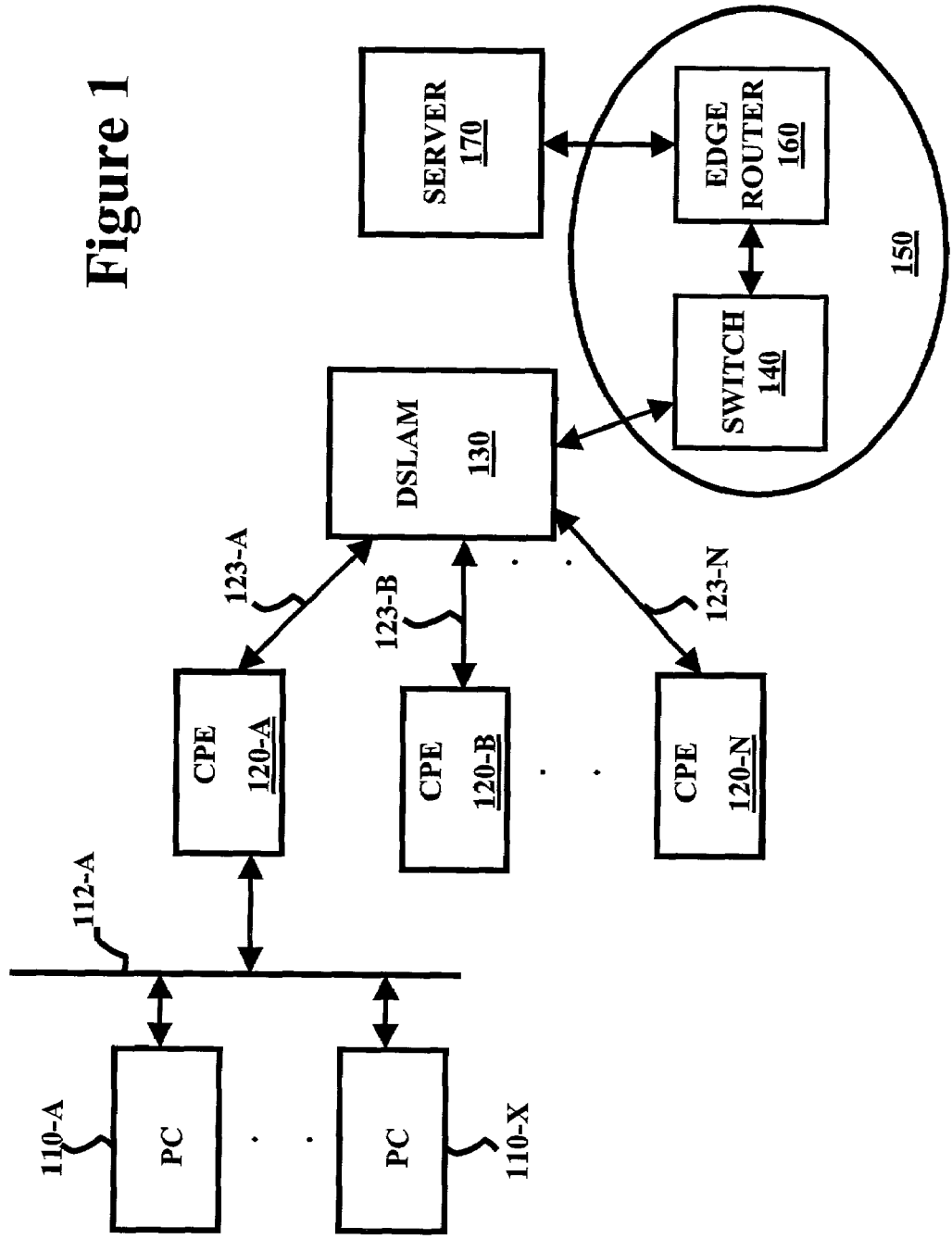
FIG. 1 is a block diagram illustrating an example environment in which the present invention can be implemented.

FIG. 1 is a block diagram illustrating an example environment in which the present invention can be implemented. The environment is shown containing personal computer (PC) systems 110-A through 110-X, customer premise equipments (CPE) 120-A through 120-N, telephone lines 123-A through 123-N, digital subscriber's loop access multiplexor (DSLAM) 130, switch 140 and edge router 160 in network 150, and server 170. Each component is described below in further detail.

The environment is shown containing only a few representative components for illustration. In reality, each environment typically contains many more components. CPE 120-A through 120-N are described with reference to CPE 120-A only for conciseness.

Similarly, telephone lines 123-A through 123-N are described with reference to telephone line 123-A.

PCs 110-A through 110-X access server 170 using CPE 120-A, DSLAM 130, switch 140 and edge router 160. PCs 110-A through 110-X are examples of user systems, and are shown connected to CPE 120-A by a local area network (LAN) 112. Network 150 may be implemented using technologies such as ATM, IP and Frame Relay, and may be implemented in a known way.

DSLAM 130 receives packets from CPEs 120-A through 120-N, and transmits the received packets to network 150. Similarly, DSLAM 130 receives packets from network 150, and forwards the received packets to one of CPE 120-A through 120-N. In an embodiment, each packet corresponds to an ATM cell. In a scenario, components such as DSLAM, switches and edge routers are provided by service providers commonly referred to as internet service providers (ISPs).

CPE 120-A receives data packets transmitted by PC 110-A through 110-N, and forwards the contained data to DSLAM 130. Similarly, data received from DSLAM 130 is forwarded to the appropriate one of the PCs 110-A through 110-X. In one embodiment, the communication between PCs and CPE 120-A is implemented using Internet Protocol (IP).

A virtual circuit may be provisioned between CPE 120-A and another end system, e.g., edge router 160. The virtual circuit facilitates data transfers between CPE 120-A and edge router 160 (end systems of the virtual circuit). An embodiment of CPE 120-A is implemented using 800 series router product available from Cisco Systems, Inc., the assignee of the subject patent application.

To provide data transfer ability between CPE 120-A and edge router 160, the two devices may need to be configured with a segment identifier (of the segment between CPE 120-A and DSLAM 130). A segment identifier identifies the portion of the virtual circuit between the two devices. In the context of ATM technology, the VPI/VCI forms the segment identifier and both the devices may need to be configured with the segment identifier.

A service provider may configure the VPI/VCI in DSLAM 130. VPI/VCI corresponding to other segments may also be configured in the pair of devices at either end of each segment of the virtual circuit. Once the VPI/VCI of segment 123-A is configured in CPE 120-A, data may be successfully transferred between PC 110-A and server 170. The manner in which the segment identifier may be configured in CPE 120-A is described below first with reference to an example method and then an example apparatus.

3. Method

Figure 2:
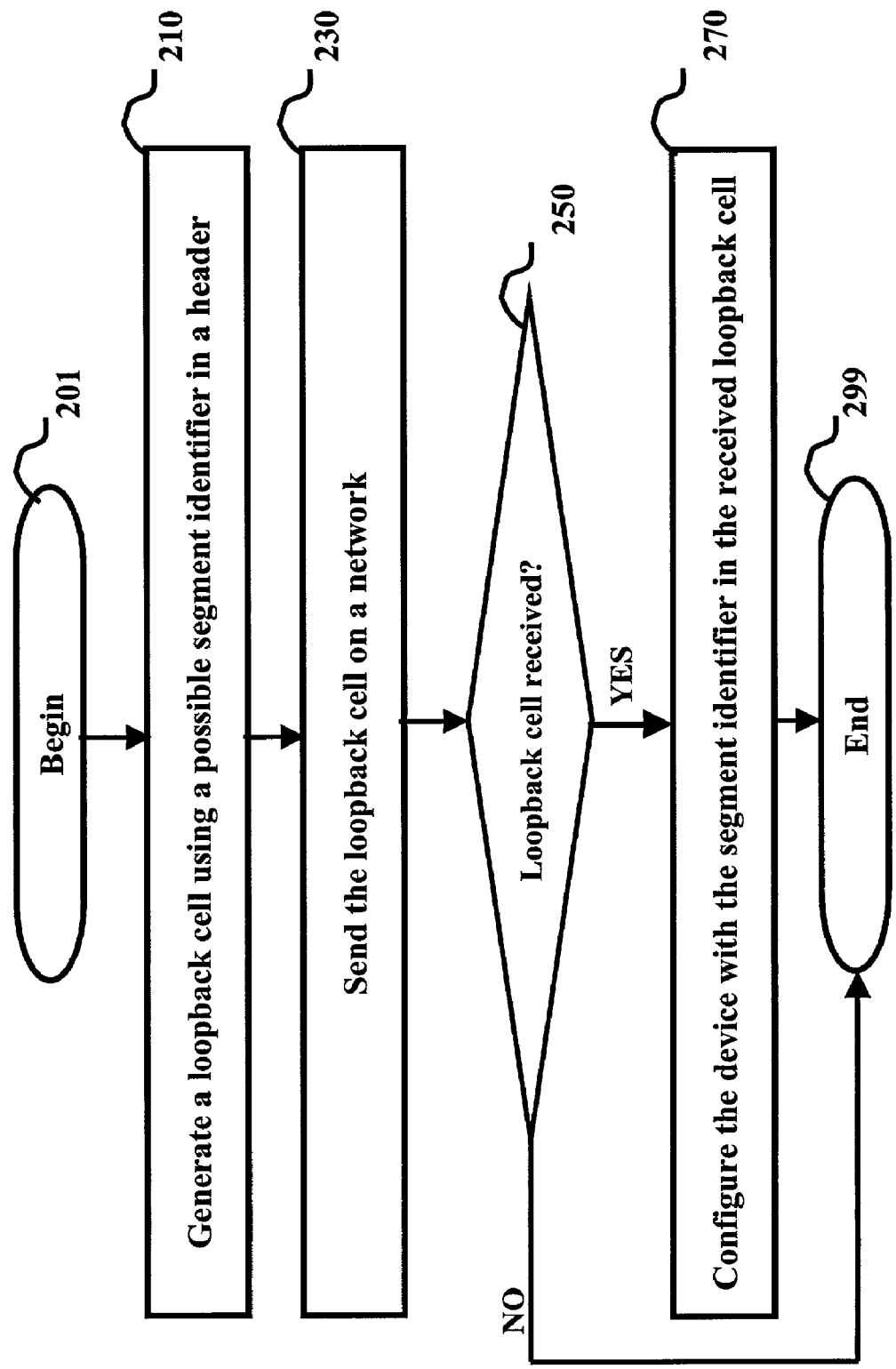
FIG. 2 is a flow chart illustrating a method in accordance with the present invention.

FIG. 2 is a flow-chart illustrating a method using which a device may be configured automatically with a segment identifier of a virtual circuit. The method is described below with reference to CPE 110-A of FIG. 1 for illustration. However, the method may be implemented in other devices as well. The method begins in step 201, in which control immediately passes to step 210.

In step 210, CPE 110-A generates a loopback cell using a potentially correct segment identifier. A loopback cell generally refers to a cell which would cause another device to send back the cell, potentially with some changes to the contents of the cell as is well known in the relevant arts. In step 230, CPE 110-A sends the generated loopback cell. The sending may be performed in a known way.

In an embodiment, each cell corresponds to a OAM F5 cell described in further detail in ITU-T Recommendation 1.610 entitled, "Series I: Integrated Services Digital Network—Maintenance principles: B-ISDN operation and maintenance principles and functions", which is incorporated in its entirety herewith.

As may be appreciated, each loopback cell contains a segment identifier in the header. A potentially correct segment identifier is thus placed in the generated loopback cell. In one embodiment (implemented in the context of ATM), CPE 110-A generates many cells, all together containing possible combinations of VPI/VCI values.

However, if the range of potentially correct VPI/VCI values can be restricted, for example based on user input or other convention, segment identifiers may be restricted to the range (and thus the number of cells minimized). In this regard, it is noted that a device in accordance with FIG. 2 may send several loopback cells even though the flow chart of FIG. 2 describes the manner in which each loopback cell is used.

Continuing with reference to FIG. 2, in step 230, CPE 110-A examines any received cells to determine whether a sent loopback cell is successfully looped back. As is well known in the relevant arts, there are at least two types of loopback cells—(1) segment loopback cells; and (2) end-to-end loopback cells. The manner in which the two types of cells are generally processed, is described below.

In case of segment loopback cells, the device at the other end of segment loops back a properly received loopback cell. Thus, with reference to FIG. 2, assuming a segment is provided between CPE 110-A and switch 140, a loopback cell would be looped back by switch 140, and CPE 110-A receives the looped back cell.

In case of end-to-end loopback cells, an end system at the other end of the virtual circuit loops back an end-to-end loopback cell. Assuming that a virtual circuit is sought to be provisioned between CPE 110-A and edge router 160, an end-to-end loopback cell would be looped back by edge router 160.

Further assuming that all devices except CPE 110-A are configured with the appropriate segment identifiers (for appropriate provisioning of a virtual circuit), when CPE 110-A sends an end-to-end loopback cell with the correct segment identifier, edge router 160 receives the cell and loops back the received cell. In case a wrong segment identifier was used in step 210, no response would be received.

Thus, CPE 110-A receives a loopback cell in response to a sending a cell which contained the correct segment identifier in the header. Control passes to step 270 if a loopback cell is received, or else control passes to step 299, where the method ends.

In step 270, CPE 110-A is configured with the segment identifier of the received cell. Configuration generally entails storing the segment identifier in a memory (e.g., a register and/or non-volatile storage) such that the stored data can again be used while sending additional cells on the virtual circuit.

Thus, using the method described above, a device may be automatically configured with an identifier of a segment to which the device is connected. The description is continued with reference to the details of an embodiment of CPE 120-A.

4. Customer Premise Equipment

Figure 3:
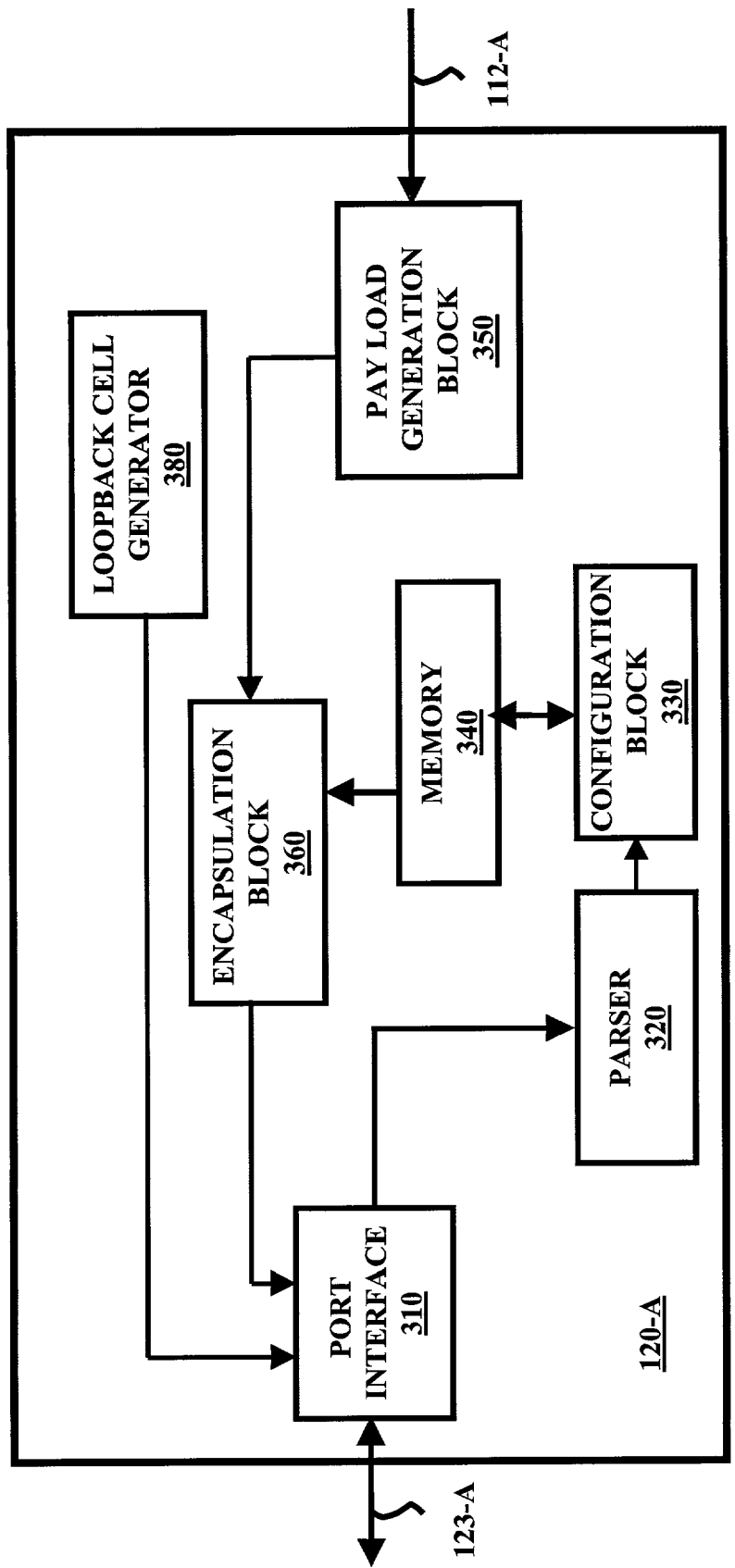
FIG. 3 is a block diagram illustrating the internals of an embodiment of customer premise equipment provided in accordance with the present invention.

FIG. 3 is a block diagram illustrating the details of an embodiment of customer premise equipment (CPE) 120-A as relevant to several aspects of the present invention. CPE 120-A is shown containing port interface 310, parser 320, configuration block 330, memory 340, payload generation block 350, encapsulation block 360 and loopback cells generator 380. Each block is described below in further detail.

Port interface 310 provides the physical, electrical and protocol interface to receive and send ATM cells on telephone line 123-A (supporting a segment of a virtual circuit). Port interface 310 forwards the received cells to parser 320. Similarly, cells received from encapsulation block 360 are transmitted on telephone line 123-A. Port interface 310 may be implemented in a known way.

Loopback cells generator 380 generates loopback cells (e.g., segment loopback cells or end-to-end loopback cells) for transmission on telephone line 123-A. Each cell is generated using a possible segment identifier. As noted above, cells with all possible values of segment identifiers can be used. Or in the alternative, only a subset of values may be used depending on any available information on the possible values. The generated cells are provided to port interface 310 for transmission on telephone line 123-A. Information reflecting the generated (sent) loopback cells may be maintained in memory 340.

Parser 320 examines the cells received from port interface 310 to determine whether a received cell corresponds to a loopback cell. The examination can be performed in a known way. Parser 320 forwards the received loopback cells to configuration block 330. The received loopback cells contain the segment identifier in the header portion.

Configuration block 330 stores the segment identifier in memory 340. Memory 340 may be implemented using a non-volatile memory such that the segment identifier is available even after CPE 120-A is powered off and on. However, memory 340 generally needs to include fast circuits such as registers and random access memories such that the segment identifier is quickly made available for construction of headers while transmitting data. In addition, memory 340 may provide for storing and retrieving of data related to the transmitted loopback cells.

Payload generation block 350 receives data packets from PCs 110-A through 110-X on LAN 112-A. In environments implemented using Internet Protocol, the received packets may be of variable length. Payload generation block 350 segments the data packets to generate payloads suitable for transmission in ATM cells, and may be implemented according to segmentation and reassembly (SAR) protocol well known in the relevant arts.

Encapsulation block 360 receives payload generated by payload generation block 350, and encapsulates the payload with a header to generate a corresponding ATM cell. The header contains the segment identifier stored in memory 340. The encapsulated data packet is provided to port interface 310 which forwards the encapsulated data packet to DSLAM 130. The encapsulation may be performed in a known way.

Thus, using the approaches described above, the configuration of a CPE can be simplified substantially. It should be understood that each feature of the present invention can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing CPE 120-A with a desired mix of hardware, software and/or firmware. An embodiment implemented substantially in software is described below.

5. Software Implementation

Figure 4:
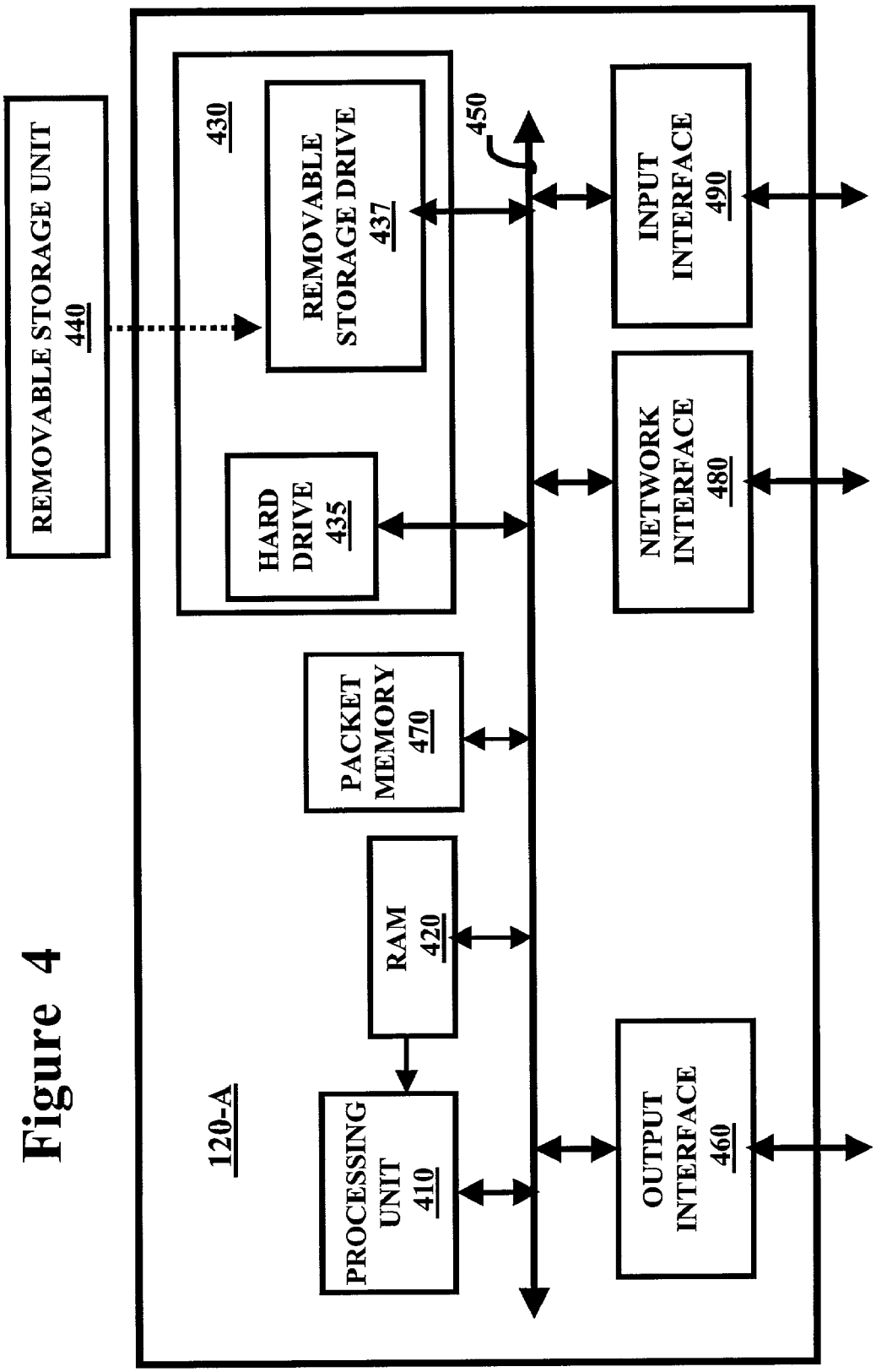
FIG. 4 is a block diagram illustrating the details of an embodiment of customer premise equipment implemented substantially in the form of software according to an aspect of the present invention.

FIG. 4 is a block diagram illustrating the details of CPE 120-A in one embodiment. CPE 120-A is shown containing processing unit 410, random access memory (RAM) 420, storage 430, output interface 460, packet memory 470, network interface 480 and input interface 490. Each component is described in further detail below.

Output interface 460 provides output signals (e.g., display signals to a display unit, not shown) which can form the basis for a suitable user interface for an administrator (configuring CPE 120-A) to interact with CPE 120-A. Input interface 490 (e.g., interface with a key-board and/or mouse, not shown) enables an administrator to provide any necessary inputs to CPE 120-A. For example, using input interface 490 and output interface 460, a user may instruct CPE 120 to automatically determine and configure the segment identifier. In addition, the user may be provided an opportunity to specify a possible range of segment identifiers.

Network interface 480 enables CPE 120-A to send and receive data on communication networks using asynchronous transfer mode (ATM) and internet protocol (IP). Network interface 480, output interface 460 and input interface 490 can be implemented in a known way.

RAM 420, storage 430, and packet memory 470 may together be referred to as a memory. RAM 420 receives instructions and data on path 450 from storage 430, and provides the instructions to processing unit 410 for execution. Packet memory 470 stores (queues) cells/packets waiting to be forwarded (or otherwise processed) on different ports.

Secondary memory 430 may contain units such as hard drive 435 and removable storage drive 437. Secondary storage 430 may store the software instructions and data, which enable CPE 120-A to provide several features in accordance with the present invention. In an embodiment, memory 340 of FIG. 3 may be implemented using RAM 420, storage 430 and secondary memory 430.

Some or all of the data and instructions may be provided on removable storage unit 440, and the data and instructions may be read and provided by removable storage drive 437 to processing unit 410. Floppy drive, magnetic tape drive, CD-ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420. In general processing unit 410 reads sequences of instructions from various types of memory medium (including RAM 420, storage 430 and removable storage unit 440), and executes the instructions to provide various features of the present invention.

Embodiments according to FIG. 4 can be used to configure a segment identifier in CPE 120-A as described above. While the embodiments above have been described with reference to ATM substantially, it should be understood that various aspects of the present invention can be implemented in other environments (e.g., frame relay). Implementations in such other environments are also contemplated to be within the scope and spirit of several aspects of the present invention.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of configuring a segment identifier in a device, said segment identifier identifying a segment of a virtual circuit, wherein said virtual circuit is provisioned on a network, said device being connected to said network, said method being performed in said device, said method comprising:

sending a loopback packet on said network, said loopback packet containing a possible segment identifier in a header;

determining that said possible segment identifier is an accurate segment identifier if said loopback packet is received by said device from said network; and configuring said accurate segment identifier in said device such that said segment identifier is provided for construction of headers while transmitting data from said device.

2. The method of claim 1, wherein said configuring comprises storing said accurate segment identifier in a memory which provides said segment identifier when transmitting said data from said device.

3. The method of claim 2, wherein said loopback packet comprises an asynchronous transfer mode (ATM) cell and said segment identifier comprises a VPI/VCI.

4. The method of claim 3, wherein said ATM cell comprises an operation and maintenance (OAM) cell.

5. The method of claim 4, wherein said device comprises a customer premise equipment, and wherein said another device comprises an edge router, and wherein said OAM cell is either a segment loopback cell or an end-to-end loopback cell.

6. The method of claim 5, further comprising:

receiving another packet from a user system;

segmenting said another packet into a plurality of payloads;

encapsulating said plurality of payloads into a corresponding plurality of ATM cells using a header containing said accurate segment identifier stored in said memory; and transmitting said plurality of ATM cells on said virtual circuit.

7. The method of claim 6, wherein said another packet comprises an Internet Protocol packet.

8. An apparatus for configuring a segment identifier of a virtual circuit in a device, said device being connected to a network, said apparatus comprising:

a memory designed to provide said segment identifier for transmitting data from said device;

a loopback generator generating a loopback packet using a possible segment identifier in a header of said loopback packet;

a port interface coupled to said network, said port interface for sending said loopback packet on said network, said port interface receiving another packet from said network;

a parser coupled to said port interface, said parser examining said another packet to determine whether said another packet is received in response to said sending said loopback packet, said possible segment identifier being determined as an accurate segment identifier if said another packet is determined to be received in response to said sending said loopback packet; and a configuration block storing said accurate segment identifier as said segment identifier in said memory if said another packet is determined to be received in response to sending said loopback packet.

9. The apparatus of claim 8, wherein all of said memory, said loop back generator, said port interface, said parser and said configuration block are physically contained in said device.

10. The apparatus of claim 9, wherein said loopback packet comprises an OAM cell and said segment identifier comprises a VPI/VCI according to asynchronous transfer mode (ATM).

11. The apparatus of claim 9, further comprising:

a payload generation block, said payload generation block receiving a data packet from a user system, said payload generation block segmenting said data packet into a plurality of payloads; and an encapsulation block coupled to said payload generation block and said memory, said encapsulation block encapsulating said plurality of payloads into a corresponding plurality of ATM cells, each of said plurality of ATM cells using a header, said header containing said accurate segment identifier; wherein said port interface transmits said plurality of ATM cells on said virtual circuit.

12. An apparatus for configuring a segment identifier of a virtual circuit in a device, said device being connected to a network, said apparatus comprising:

means for sending a loopback packet on said network, said loopback packet containing a possible segment identifier in a header;

means for determining that said possible segment identifier is an accurate segment identifier if said loopback packet is received by said device from said network; and means for configuring said accurate segment identifier in said device such that said accurate segment identifier is provided for construction of headers while transmitting data from said device, wherein said means for sending, said means for determining and said means for configuring are all physically contained in said device.

13. The apparatus of claim 12, wherein said means for configuring stores said accurate segment identifier in a memory which provides said segment identifier when transmitting said data from said device.

14. The apparatus of claim 13, wherein said loopback packet comprises an asynchronous transfer mode (ATM cell and said segment identifier comprises a VPI/VCI.

15. The apparatus of claim 14, wherein said loop back cell comprises an operation and maintenance (OAM) cell.

16. The apparatus of claim 15, further comprising:
means receiving another packet from a user system;
means for segmenting said another packet into a plurality of payloads;
means for encapsulating said plurality of payloads into a corresponding plurality of ATM cells using a header containing said accurate segment identifier stored in said memory; and
means transmitting said plurality of ATM cells on said virtual circuit.

17. A computer readable medium carrying one or more sequences of instructions for causing configuration of device with a segment identifier, said segment identifier identifying a segment of a virtual circuit, wherein said virtual circuit is provisioned on a network and said device is connected to said network, wherein execution of said one or more sequences of instructions by one or more processors contained in said device causes said one or more processors to perform the actions of:

sending a loopback packet on said network, said loopback packet containing a possible segment identifier in a header;

determining that said possible segment identifier is an accurate segment identifier if said loopback packet is received by said device from said network; and configuring said accurate segment identifier in said device such that said accurate segment identifier is provided for construction of headers while transmitting data from said device.

18. The computer readable medium of claim 17, wherein said configuring comprises storing said accurate segment identifier in a memory which provides said segment identifier when transmitting said data from said device.

19. The computer readable medium of claim 18, wherein said cell comprises an asynchronous transfer mode (ATM) cell and said segment identifier comprises VPI/VCI.

20. The computer readable medium of claim 18, wherein said loop back cell comprises an operation and maintenance (OAM) cell.

21. The computer readable medium of claim 20, further comprising:
receiving another packet from a user system;
segmenting said another packet into a plurality of payloads;
encapsulating said plurality of payloads into a corresponding plurality of ATM cells using a header containing said accurate segment identifier stored in said memory; and
transmitting said plurality of ATM cells on said virtual circuit.

22. The computer readable medium of claim 21, wherein said OAM cell comprises either a segment loopback cell or an end-to-end loopback cell.

* * * * *

UNITED STATES PATENT AND TRADEMARK OFFICE
CERTIFICATE OF CORRECTION

| | |
|---|---|
| PATENT NO. | : 7,016,947 B1 |
| APPLICATION NO. | : 10/014610 |
| DATED | : March 21, 2006 |
| INVENTOR(S) | : Ah Sue |

It is certified that error appears in the above-identified patent and that said Letters Patent is hereby corrected as shown below:

Col. 4, line 24, replace "1.610" with --I.610--.

Col. 9, line 17, replace "(ATM" after the word "mode" with --(ATM)--.

Col. 10, line 17, insert "a" after the word "comprises"

Signed and Sealed this

First Day of August, 2006

JON W. DUDAS
*Director of the United States Patent and Trademark Office*